United States Patent
Pye et al.

[11] Patent Number: 5,579,801
[45] Date of Patent: Dec. 3, 1996

[54] VALVE CLOSING MECHANISM

[75] Inventors: Jack Pye, Thelwall; Michael A. Stewart, Widnes; James Barwise, Liverpool, all of United Kingdom

[73] Assignee: Imperial Chemical Industries PLC, London, England

[21] Appl. No.: 302,850

[22] PCT Filed: Feb. 28, 1993

[86] PCT No.: PCT/GB93/00181

§ 371 Date: Sep. 16, 1994

§ 102(e) Date: Sep. 16, 1994

[87] PCT Pub. No.: WO93/19316

PCT Pub. Date: Sep. 30, 1993

[30] Foreign Application Priority Data

Mar. 18, 1992 [GB] United Kingdom ............... 9205876

[51] Int. Cl.⁶ ............................................. F16K 17/36
[52] U.S. Cl. ..................... 137/78.5; 251/58; 251/279; 251/292
[58] Field of Search ....................... 251/291, 292, 251/58, 62, 279; 137/78.4, 78.5

[56] References Cited

U.S. PATENT DOCUMENTS

| | | |
|---|---|---|
| 2,429,779 | 4/1944 | Stine . |
| 2,744,541 | 5/1956 | Fleischhauer ............... 251/230 |
| 2,841,119 | 7/1958 | Haard . |
| 3,317,179 | 5/1967 | Willis ............................ 251/58 |
| 3,610,568 | 10/1971 | Duwe ........................... 251/58 |
| 3,955,186 | 5/1976 | Green et al. ................. 137/78.4 |
| 4,180,238 | 12/1979 | Muchow ...................... 251/230 |
| 4,629,157 | 12/1986 | Tsuchiya et al. ............. 251/292 |
| 4,637,423 | 1/1987 | Gray . |
| 5,238,022 | 8/1993 | Zink ............................. 251/230 |

FOREIGN PATENT DOCUMENTS 27582 of 1910 United Kingdom ............... 251/230

Primary Examiner—A. Michael Chambers
Attorney, Agent, or Firm—Cushman Darby & Cushman IP Group of Pillsbury Madison & Sutro LLP

[57] ABSTRACT

A valve closing mechanism comprises a stand-off arm (18) adapted for attachment to the valve body, a lever arm (22) incorporating a fitting (24) for connection to the valve spindle (16), and an actuator (26) acting between the stand-off arm (18) and the lever arm (22) for effecting angular oscillatory movement of the lever arm, said fitting comprising a one-way drive transmitting arrangement whereby the spindle is rotated when the lever arm is displaced in one direction but remains stationary when the lever arm is displaced in the opposite direction.

6 Claims, 1 Drawing Sheet

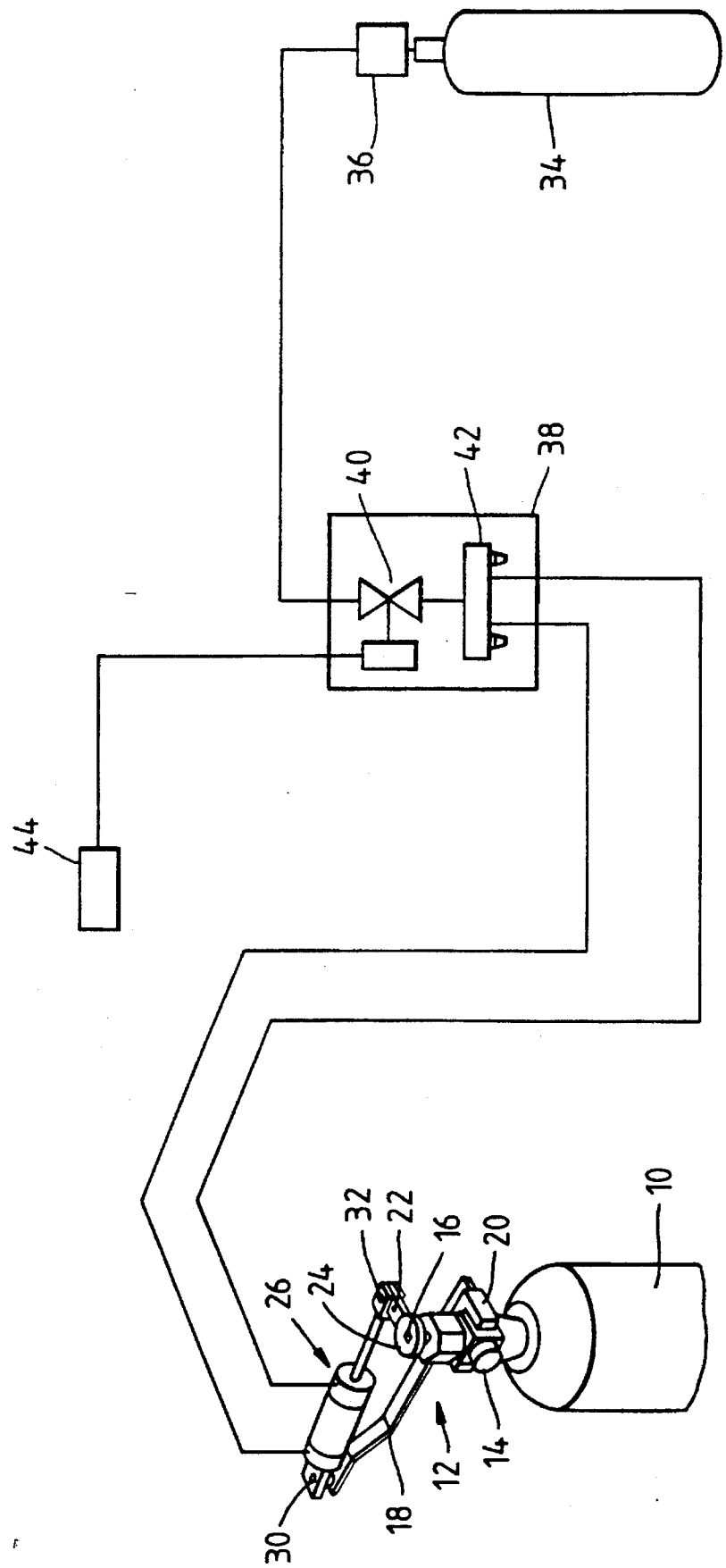

VALVE CLOSING MECHANISM

This invention relates to valve closing mechanisms for use in closing spindle-controlled valves of the type used with gas storage vessels.

Toxic or hazardous fluids such as chlorine are often stored in cylinders equipped with a valve which is designed to be turned on and off by means of a rotatable spindle, rotation of which serves to move a valve member relative to a valve seat.

If there is a leakage of the toxic fluid downstream of the storage vessel, it is essential that the valve is closed rapidly and reliably without risk to personnel.

According to one aspect of the present invention there is provided a valve closing mechanism comprising a stand-off arm adapted for attachment to the valve body, a lever arm incorporating a fitting for connection to the valve spindle, and an actuator acting between the stand-off arm and the lever arm for effecting angular oscillatory movement of the lever arm, said fitting comprising a one-way drive transmitting arrangement whereby the spindle is rotated when the lever arm is displaced in one direction but remains stationary when the lever arm is displaced in the opposite direction.

According to a second aspect of the invention there is provided a valve assembly with combined valve closing mechanism, comprising:

a valve body having an outlet;

valve means associated with the outlet;

a spindle mounted for rotation relative to the valve body and coupled to the valve means whereby rotation of the spindle in one sense effects valve closure and rotation in the opposite sense effects valve opening;

a stand-off arm adapted for attachment to the valve body;

a lever arm connected to the valve spindle via a one-way drive transmitting arrangement whereby the spindle is rotated when the lever arm is displaced in one direction but remains stationary when the lever arm is displaced in the opposite direction; and an actuator acting between the stand-off arm and the lever arm for effecting angular oscillatory movement of the lever arm.

In accordance with a preferred feature of the invention, the standoff arm, the lever arm and the drive arrangement are embodied in an assembly which can be assembled and detached from the valve body as a unit thereby facilitating rapid changeover when it is necessary to replace a depleted storage vessel.

Preferably the connection between the spindle and the stand-off arm via the lever arm and the actuator is of a quick-release nature so that, in the event of valve closure being effected by the actuator, access to the spindle can be had rapidly to allow the valve to be opened (when safe to do so) for example by manual manipulation of the spindle with the aid of a suitable tool.

Preferably the actuator is in the form of a double acting pneumatic piston and cylinder assembly.

The one-way drive transmitting device conveniently comprises a pawl and ratchet drive, for example of the type commonly employed in ratchet spanners.

According to another aspect of the invention there is provided a gas supply system comprising at least one gas storage vessel having a valve-controlled outlet and an associated valve closing mechanism in the form defined in said one aspect of the invention, means for controlling operation of the valve closing mechanism or mechanisms, the control means including gas sensing means responsive to the stored gas and being operable, upon detection of gas by the sensing means, to initiate operation of the actuator to close the or each valve.

The invention will now be described by way of example only with reference to the accompanying drawing, the sole FIGURE of which is a schematic diagram showing the valve operating mechanism and associated pneumatic circuity.

Referring to the drawing, the storage vessel (which is shown in part only) is of the common cylinder type used for storage of gases such as chlorine. The cylinder 10 has an outlet fitted with a conventional valve assembly 12 having an outlet 14 through which the gas is supplied to downstream equipment when the valve assembly is open. Valve closure and opening is effected by rotation of a spindle which at its upper end terminates in a squared section 16 for co-operation with a suitable tool. In contrast with conventional practice, instead of closing the valve manually with a tool, the cylinder 10 is equipped with an automatic valve closing mechanism.

The mechanism comprises a standoff arm 18 which is non-rotatably fitted to the body of the valve assembly 12 by means of a suitable clamping arrangement 20. The squared section of the spindle is connected to a lever arm 22 having a ratchet and pawl drive fitting 24 which has an opening for reception of the squared section. The pawl and ratchet fitting is so designed that angular movement of the lever arm 22 in one sense is transmitted to the spindle to turn the same but angular movement in the opposite sense is not transmitted to the spindle. The lever arm 22 and the drive fitting 24 may be constituted by a ratchet-type spanner or a design based thereon. Angular movement of the lever arm 22 is effected by means of a double acting pneumatic piston and cylinder assembly 26 connected by pivotal connections 30, 32 between the outboard ends of the lever arm 22 and the standoff arm 18. At least one of the pivotal connections is so designed as to permit the drive fitting to be released from the squared spindle section 16 without the need for any special tools, eg. by lifting the lever arm upwardly.

Compressed air is supplied to the piston and cylinder assembly 26 from a compressed air cylinder 34 via a regulator 36 and control unit 38 incorporating a valve 40 and a pneumatic switching arrangement 42 which, when the valve 40 is open, serves to switch the air supply alternately between opposite ends of the pneumatic cylinder to effect reciprocation of the piston and thereby oscillate the lever arm 22 angularly, each movement of the lever arm in the appropriate sense being effective to partly shift the spindle in the closing direction so that the valve is closed progressively. The valve 40 is controlled by a detector 44 sensitive to the gas stored in the cylinder 10. In the drawing, only one cylinder 10 is shown but, in practice, there will usually be a number of cylinders each equipped with its own valve closing mechanism with the piston and cylinder assembly of each such assembly connected via air supply lines to the control unit 38 which may be common to all of the mechanisms.

It will be understood that the valve closing mechanisms are present as a precautionary measure and will not usually affect operation of the gas supply system. Initially, during setting up, after clamping of the standoff arm 18 to the valve body and connection of the outlet 14 of the cylinder 10 to the downstream equipment, the valve 12 is opened by manipulation of the spindle using a suitable tool temporarily engaged with the squared section 16. The drive fitting 24 is then connected to the squared section 16. In normal operation, the valve 12 is unaffected by the closing mechanism. If however, the detector 44 senses the presence of gas in the surroundings, the valve 40 is operated to supply compressed air to the piston and cylinder assembly via the switching arrangement 42 thereby effecting progressive closure of the valve 12 of each storage cylinder. The system my include an alarm device to draw attention to the fact that the valve closing mechanism(s) have come into operation.

In the event of operation of the valve closing mechanisms, once the source of any leak has been traced and remedied, each valve 12 is then manually restored to the open position by releasing the drive fittings from the squared spindle sections 16 and rotating the spindle in the valve opening direction using a suitable tool. The drive fittings 24 are then refitted to the spindles to bring the valve closing mechanisms back into operation.

From the foregoing, it will be seen that valve closure is effected in a particularly simple manner without the need for action on the part of personnel. Moreover, the valve closing mechanism is of simple design, can be fabricated economically and is readily changed over from one cylinder to another when cylinder replacement is necessary. In the latter event, all that is necessary is to release the drive fitting 24 and then detach the valve mechanism from the cylinder as a unit by releasing the clamping arrangement 20.

We claim:

1. A valve assembly with combined valve closing mechanism, comprising:

a valve body having an outlet;

valve means associated with the outlet;

a spindle mounted for rotation relative to the valve body and coupled to the valve means whereby rotation of the spindle in one sense effects valve closure and rotation in the opposite sense effects valve opening;

a stand-off arm adapted for attachment to the valve body;

a lever arm connected to the valve spindle via a one-way drive transmitting arrangement whereby the spindle is rotated when the lever arm is displaced in one direction but remains stationary when the lever arm is displaced in the opposite direction; and an actuator acting between the stand-off arm and the lever arm for effecting angular oscillatory movement of the lever arm, wherein the standoff arm, the lever arm and the drive arrangement are embodied in an assembly which can be assembled and detached from the valve body as a unit, and the assembly includes means to readily allow attachment to or detachment from the valve body.

2. A mechanism as claimed in claim 1 in which the actuator is in the form of a double acting pneumatic piston and cylinder assembly.

3. A mechanism as claimed in claim 2 in which the one-way drive transmitting device comprises a pawl and ratchet drive.

4. A gas supply system comprising at least one gas storage vessel having a valve-controlled outlet and an associated valve closing mechanism in the form defined in claim 2, means for controlling operation of the valve closing mechanism or mechanisms, the control means including gas sensing means responsive to the stored gas and being operable, upon detection of gas by the sensing means, to initiate operation of the actuator to close the or each valve.

5. A mechanism as claimed in claim 1 in which the one-way drive transmitting device comprises a pawl and ratchet drive.

6. A gas supply system comprising at least one gas storage vessel having a valve-controlled outlet and an associated valve closing mechanism in the form defined in claim 1, means for controlling operation of the valve closing mechanism or mechanisms, the control means including gas sensing means responsive to the stored gas and being operable, upon detection of gas by the sensing means, initiate operation of the actuator to close the or each valve.

* * * * *